(12) United States Patent
Bowers et al.

(10) Patent No.: US 12,454,035 B2
(45) Date of Patent: Oct. 28, 2025

(54) SHIELD ASSEMBLY FOR POWER TOOL

(71) Applicant: Black & Decker Inc., New Britain, CT (US)

(72) Inventors: Levi G. Bowers, Manchester, MD (US); Daniel F. Nace, Towson, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 18/517,481

(22) Filed: Nov. 22, 2023

(65) Prior Publication Data

US 2024/0198482 A1 Jun. 20, 2024

Related U.S. Application Data

(60) Provisional application No. 63/476,055, filed on Dec. 19, 2022.

(51) Int. Cl.
| | |
|---|---|
| *B24B 55/05* | (2006.01) |
| *B24B 23/02* | (2006.01) |
| *B25F 5/00* | (2006.01) |

(52) U.S. Cl.
CPC ............ *B24B 55/052* (2013.01); *B25F 5/001* (2013.01); *B24B 23/028* (2013.01)

(58) Field of Classification Search
CPC .................................................. B24B 55/052
See application file for complete search history.

(56) References Cited

U.S. PATENT DOCUMENTS

| | | | |
|---|---|---|---|
| 3,585,980 | A | 6/1971 | Mellor |
| 4,905,424 | A | 3/1990 | Nagashima et al. |
| 5,033,192 | A | 7/1991 | Franz et al. |
| D376,968 | S | 12/1996 | Kim |
| D456,685 | S | 5/2002 | Keller |
| 7,310,879 | B1 | 12/2007 | Clarke et al. |

(Continued)

FOREIGN PATENT DOCUMENTS

| | | |
|---|---|---|
| CN | 201889718 U | 7/2011 |
| CN | 207372905 U | 5/2018 |

(Continued)

OTHER PUBLICATIONS

Extended European Search Report mailed Jul. 12, 2024 in corresponding EP application No. 23216280.0, 12 pages.
Partial European Search Report mailed Apr. 12, 2024 in corresponding EP application No. 23216280.0, 13 pages.

*Primary Examiner* — Daniel Jeremy Leeds
(74) *Attorney, Agent, or Firm* — Amir R. Rohani

(57) ABSTRACT

A shield assembly includes a guard collar and a guard member. The guard collar is disposed around a neck of a gear case of a power tool and includes a first engagement interface. The first engagement interface extends along an outer perimeter of the guard collar and defines a circumferential recess. The guard member includes a second engagement interface for removably engaging with the first engagement interface to secure the guard member to the guard collar. The second engagement interface includes a circumferential engagement member for mating with the circumferential recess of the first engagement interface. The guard member includes a body portion for at least partially surrounding a working member of the power tool.

19 Claims, 11 Drawing Sheets

(56) References Cited

U.S. PATENT DOCUMENTS

| | | | |
|---|---|---|---|
| 7,596,872 | B2 | 10/2009 | Clarke et al. |
| D687,281 | S | 8/2013 | Aglassinger |
| 10,357,868 | B2 | 7/2019 | Kawakami et al. |
| 10,478,943 | B2 | 11/2019 | Nakamura et al. |
| 10,556,319 | B2 | 2/2020 | Iwakami et al. |
| 11,014,214 | B2 | 5/2021 | Shibata et al. |
| 11,072,052 | B2 | 7/2021 | Aiken et al. |
| 2004/0154168 | A1 | 8/2004 | McDonald |
| 2006/0068690 | A1 | 3/2006 | Koschel et al. |
| 2013/0000935 | A1* | 1/2013 | Kelleher ............... B23Q 11/08 173/46 |
| 2013/0283622 | A1 | 10/2013 | Eto et al. |
| 2020/0338689 | A1 | 10/2020 | Alvarez |
| 2021/0053186 | A1 | 2/2021 | Kuo et al. |

FOREIGN PATENT DOCUMENTS

| | | | |
|---|---|---|---|
| CN | 110524042 | A | 12/2019 |
| CN | 110962017 | A | 4/2020 |
| CN | 215847473 | U | 2/2022 |
| DE | 2826414 | A1 | 12/1979 |
| DE | 19518854 | B4 | 4/2007 |
| DE | 202015103412 | U1 | 7/2015 |
| DE | 102018118286 | A1 | 1/2020 |
| DE | 202020104624 | U1 | 9/2020 |
| GB | 940226 | A | 10/1963 |
| WO | 2020026747 | A1 | 2/2020 |
| WO | 2021030953 | A1 | 2/2021 |

* cited by examiner

SHIELD ASSEMBLY FOR POWER TOOL

RELATED APPLICATION

The present disclosure claims the benefit of U.S. Provisional Patent Application No. 63/476,055 filed Dec. 19, 2022, which is incorporated herein by reference in its entirety.

FIELD

The present disclosure generally relates to power tools and, more particularly, to a shield assembly for a power tool.

BACKGROUND

An angle grinder is a metalworking tool used for grinding or cutting a metal workpiece. Powered hand tool devices such as angle grinders typically include protective guards or shields to prevent sparks, particulate material, or fragments of a rotating accessory (e.g., in the event of a wheel "burst") from being directed toward the operator, as well as to prevent inadvertent operator contact with the working tool (e.g., the cutting/grinding blade). A tool (e.g., a wrench, a screwdriver, etc.) is often required to remove or reposition the shield. Consequently, operators often remove the shield or use the shield contrary to guidelines or recommendations, which can increase a likelihood of injury.

SUMMARY

The following disclosure describes non-limiting examples of some embodiments. For instance, other embodiments of the disclosed systems and methods may or may not include the features described herein. Moreover, disclosed advantages and benefits can apply only to certain cases of the invention and should not be used to limit the disclosure. The embodiments disclosed herein each have several aspects, no single one of which is solely responsible for the disclosure's desirable attributes.

Embodiments of the present disclosure relate to a shield assembly. In some cases, a shield assembly can include a guard collar and a guard member. The guard collar may be disposed around a neck of a gear case of a power tool and can include a first engagement interface. The first engagement interface can extend along at least a portion of an outer perimeter of the guard collar, and the first engagement interface can define a circumferential recess. The guard member can include a second engagement interface for removably engaging with the first engagement interface to secure the guard member to the guard collar. The second engagement interface can include a circumferential engagement member for mating with the circumferential recess of the first engagement interface. The guard member can have a body portion for at least partially surrounding a working member of the power tool.

The shield assembly of the previous paragraph may also include a combination of the following features described in this paragraph, among other things described herein. The guard collar can include a base portion can extend entirely around the neck of the gear case and a guard attachment portion can extend radially outward from the base portion. The guard attachment portion can include the first engagement interface. The circumferential recess can extend along a majority of an outer perimeter of the guard attachment portion. The circumferential recess can be a single, continuous recess. The guard attachment portion can extend between about 120° and 240° around the base portion. The guard member can include a generally semicircular body portion.

The shield assembly of any of the previous paragraphs may also include a combination of the following features described in this paragraph, among other things described herein. The body portion include a generally planar portion oriented orthogonal to a rotation axis of a tool spindle of the power tool and a transverse portion oriented generally parallel to the rotational axis of the tool spindle. An internal edge of the generally planar body portion can define an engagement member for engaging with a circumferential recess of the guard collar. The guard member can include a pivot member proximate a first end of the circumferential engagement member, and a protruding member proximate a second end of the circumferential engagement member. Engaging the guard member with the guard collar can include inserting the pivot member into a cavity of the circumferential recess and pivoting the guard member about the pivot member towards the guard collar to insert the protruding member into the circumferential recess. The protruding member can be engageable by a latch of the guard collar to secure the guard member to the guard collar. The guard collar can include a latch for removably securing the guard member to the guard collar. During installation of the guard member on the guard collar, the latch moves to a locked position, thereby inhibiting disengagement of the guard member from the guard collar.

The shield assembly of any of the previous paragraphs may also include a combination of the following features described in this paragraph, among other things described herein. The guard collar can include an unlocking member. The unlocking member can be movable to move the latch from the locked position to an unlocked position and thereby permit disengagement of the guard member from the guard collar. The guard collar can include a latch assembly that includes the latch, a biasing member that biases the latch, and a screw that secures the latch assembly to the guard collar. During the installation, a portion of the guard member can contact and impart a force on the latch that pivots the latch about the screw into an unlocked position. The first engagement interface can define a set of cavities along the circumferential recess. The second engagement interface can define a set of protrusions along the circumferential engagement member. During attachment of the guard member to the guard collar, each protrusion of the set of protrusions can align with a respective cavity of the set of cavities. The set of cavities can function as a lock-out scheme that inhibits a mating between the guard collar and any guard members that include one or more protrusions that do not align with a respective cavity of the set of cavities. The set of protrusions can function as a lock-out scheme that inhibits a mating between the guard member and any guard collars that do not include a cavity for each protrusion of the set of protrusions. The guard member can be intended for permanent attachment to the gear case of the power tool. The power tool can be a grinder.

Embodiments of the present disclosure relate to a guard collar for a power tool. In some cases, a guard collar can include a base portion can extend around a neck of a gear case of the power tool and a guard attachment portion can extend radially outward from the base portion. The guard attachment portion can include a first engagement interface. The first engagement interface can extend along a majority of an outer perimeter of the guard attachment portion, and the first engagement interface defining a circumferential recess. The first engagement interface circumferentially receives an engagement member of a guard member to removably engage the guard member with the guard collar. The guard member can include a body portion for at least partially surrounding a working member of the power tool.

The guard collar of the previous paragraph may also include a combination of the following features described in this paragraph, among other things described herein. The first engagement interface can define a set of cavities along the circumferential recess. The guard member can be one guard member of a first set of guard members with which the guard collar can be interchangeably compatible. Each guard member of the first set of guard members can include a respective set of engagement protrusions. Each engagement protrusion of a respective set of engagement protrusion can align with a cavity of the set of cavities to enable secure attachment of the respective guard member to the guard collar. The set of cavities can function as a lock-out scheme that inhibits a mating between the guard collar and any guard members that include one or more protrusions that do not align with a respective cavity of the set of cavities.

The guard collar of any of the preceding two paragraphs may also include a combination of the following features described in this paragraph, among other things described herein. The first engagement interface can define a set of cavities along the circumferential recess. The guard collar may be incompatible with any guard member of a second set of guard members. Each guard member of the second set of guard members can include a respective set of engagement protrusions. For each guard member of the second set of guard members, at least one engagement protrusion does not align with any cavities of the set of cavities, thereby preventing secure attachment of the respective guard member to the guard collar. The set of engagement protrusions can function as a lock-out scheme that inhibits a mating between the guard member and any guard collars that do not include a cavity for each engagement protrusion of the set of engagement protrusions. The guard member can be intended for permanent attachment to the gear case of the power tool. The guard collar can include one or more features of the shield assembly of the preceding paragraphs, as described herein, and/or presented in the figures.

Embodiments of the present disclosure relate to a power tool. In some cases, a power tool can include a gear case housing a gear assembly, a tool spindle, a shield assembly, and a locking assembly for releasably securing a rotational position of the shield assembly with respect to the tool spindle. The tool spindle can be mechanically coupled to the gear assembly and a dynamic working tool. The gear assembly drives rotation of the tool spindle about a rotation axis, where the rotation of the tool spindle causes a corresponding rotation in the dynamic working tool. The shield assembly is positioned proximate a first side of the gear case. The shield assembly can include a body portion for at least partially surrounding the dynamic working tool. The locking assembly can include a user actuator portion positioned proximate a second side of the gear case, the second side opposite the first side, and a locking arm can extend substantially parallel to a rotation axis of the tool spindle. An unlocking force applied to the user actuator portion disengages the locking arm from the shield assembly, thereby permitting rotation of the shield assembly with respect to the tool spindle.

The power tool of the previous paragraph may also include a combination of the following features described in this paragraph, among other things described herein. The power tool can include a biasing member positioned between the user actuator portion and the locking arm. The biasing member can exert a bias force to engage the locking arm with the shield assembly. The user actuator portion can be a push button. The unlocking force can be a pushing force on the user actuator portion that opposes the bias force of the biasing member. The biasing member can be a compression spring. The locking arm can engage a pocket defined by the shield assembly. The first side of the gear case can be a top side of the gear case. The second side of the gear case can be a bottom side of the gear case. The locking arm can extend from the user actuator portion to the shield assembly.

The power tool of any of the preceding two paragraphs may also include a combination of the following features described in this paragraph, among other things described herein. The locking arm can include a curved portion for engaging the shield assembly. The shield assembly can define a detent in a bottom portion of the shield assembly. The locking arm can engage the shield assembly by removably engaging the detent. The shield assembly can include a plurality of radially spaced detents. The locking arm can engage the shield assembly by removably engaging a selected detent of the plurality of radially spaced detents. The unlocking force can cause displacement of the locking arm from a detent of the plurality of radially spaced detents. After application of the unlocking force to the user actuator portion, rotational movement of the shield assembly can be permitted until the unlocking force can be removed and the locking arm can be aligned and engages with a detent of the plurality of radially spaced detents. The shield assembly can be the shield assembly of any of the previous paragraphs.

Embodiments of the present disclosure relate to a power tool. In some cases, a power tool can include a housing, a motor disposed within the housing, a tool spindle mechanically coupled to the motor and configured to rotatably drive a dynamic working tool, and a guard collar mounted around the tool spindle. The guard collar can include a circumferential groove having at least one locking feature configured to lock a first removable guard compatible with the power tool received in the circumferential groove, but not a second removable guard incompatible with the power tool received in the circumferential groove.

The power tool of the previous paragraph may also include a combination of the following features described in this paragraph, among other things described herein. The guard collar can include any one or any combination of the features described in any of the preceding paragraphs.

BRIEF DESCRIPTION OF THE DRAWINGS

Throughout the drawings, reference numbers can be re-used to indicate correspondence between referenced elements. The drawings are provided to illustrate embodiments of the present disclosure and do not to limit the scope thereof.

DETAILED DESCRIPTION

Although certain embodiments and examples are described below, it will be understood that the disclosure extends beyond the specifically disclosed embodiments and/or uses and obvious modifications and equivalents thereof. Thus, it is intended that the scope of the disclosure herein disclosed should not be limited by any particular embodiments described below.

Grinders are often required to have multiple guard types and sizes available to adapt to different accessories and applications. Often, each guard utilizes complex multistage stamping/forming processes and/or labor-intensive welding operations to manufacture and assemble parts. As a result, these guards can be undesirable to produce. With new compliance regulations, additional guards are required to be supplied with each grinder. Additionally, less-common guards should be readily available for end users to obtain. Guards and gear cases are often "platformed" to reduce the overall number of variations. This platform approach, coupled with a desire for the guards to be easily removed and installed (e.g., to change to different applications/accessories), results in drawbacks that impact durability and ease of use of the guards. For example, some durability is impacted due to the minimal surface area of the guard retention features.

To address these or other challenges, a shield assembly can include a separate guard collar and guard member that circumferentially attaches to the guard collar. In light of the description herein, it will be understood that the embodiments disclosed herein substantially shield assemblies for power tools. Specifically, the embodiments disclosed herein enable reduced complexity and cost of guard manufacturing by creating a guard collar that can be a universal adaptor and that can reduce the demand for complex collar geometry for every guard design. Furthermore, the embodiments disclosed herein reduce a need to remove the guard collar to replace the guard member and can allow for quickly changing out the guard members. Furthermore, the embodiments disclosed herein can provide an increased durability by improving the contact area and geometry of the contact points. For example, the guard collar can be retained by a ring clip so, in some cases, no tabs or grooves are used. Furthermore, the embodiments disclosed herein improve adjustability, as other designs can be difficult to rotate due to the geometry and materials involved.

Figure 1:
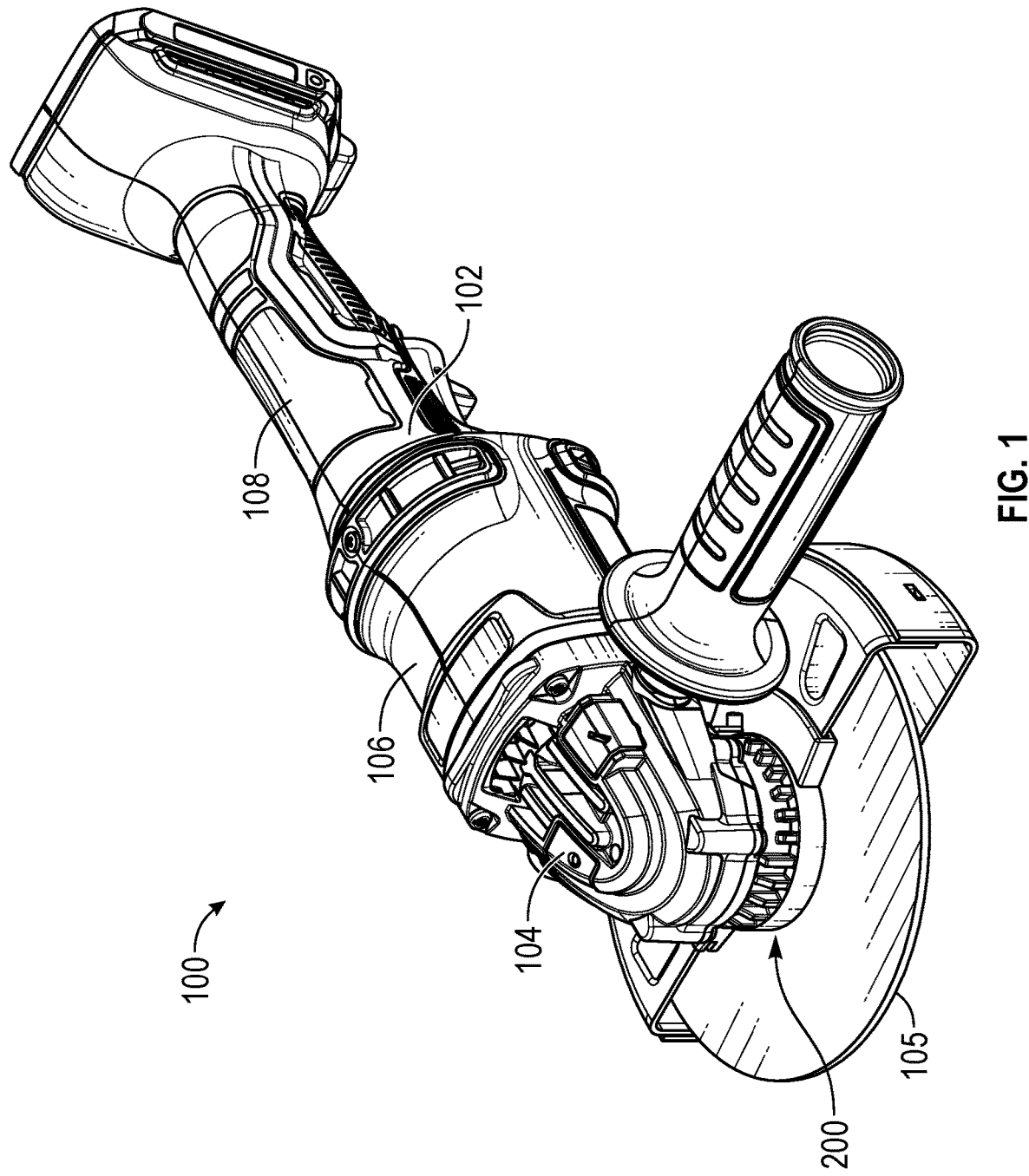
FIG. 1 illustrates a handheld tool device including an example shield assembly in accordance with the present disclosure.

FIG. 1 illustrates a handheld tool device 100 including an example shield assembly 200 in accordance with the present disclosure. The handheld tool device 100 includes a housing 102 with a forward gear case 104, a field case 106 housing a motor or armature assembly oriented rearward of the gear case 104, and a handle assembly 108 oriented rearward of the field case 106. The shield assembly 200 is coupled to the gear case 104 and is configured to shield an operator from debris (e.g., sparks, particles) generated during operation of the handheld tool device 100. The handheld tool device 100 further includes a dynamic working tool 105, which in this example is a cut off disc, and shield assembly 200, which in this example is a type A (also referred to as Type 1 or cutting guard) which shields the bottom of the accessory. Although the preceding description has outlined an example of an angle grinder, it will be appreciated that the handheld tool device 100 need not be limited to such a device. For example, the handheld tool device 100 can include, but is not limited to, a hand-held powered drill, tapper, fastener driver, horizontal grinder, vertical grinder, disc sander, belt sander, reciprocating saw, saber saw, scroll saw, jig saw, or the like.

Figure 2:
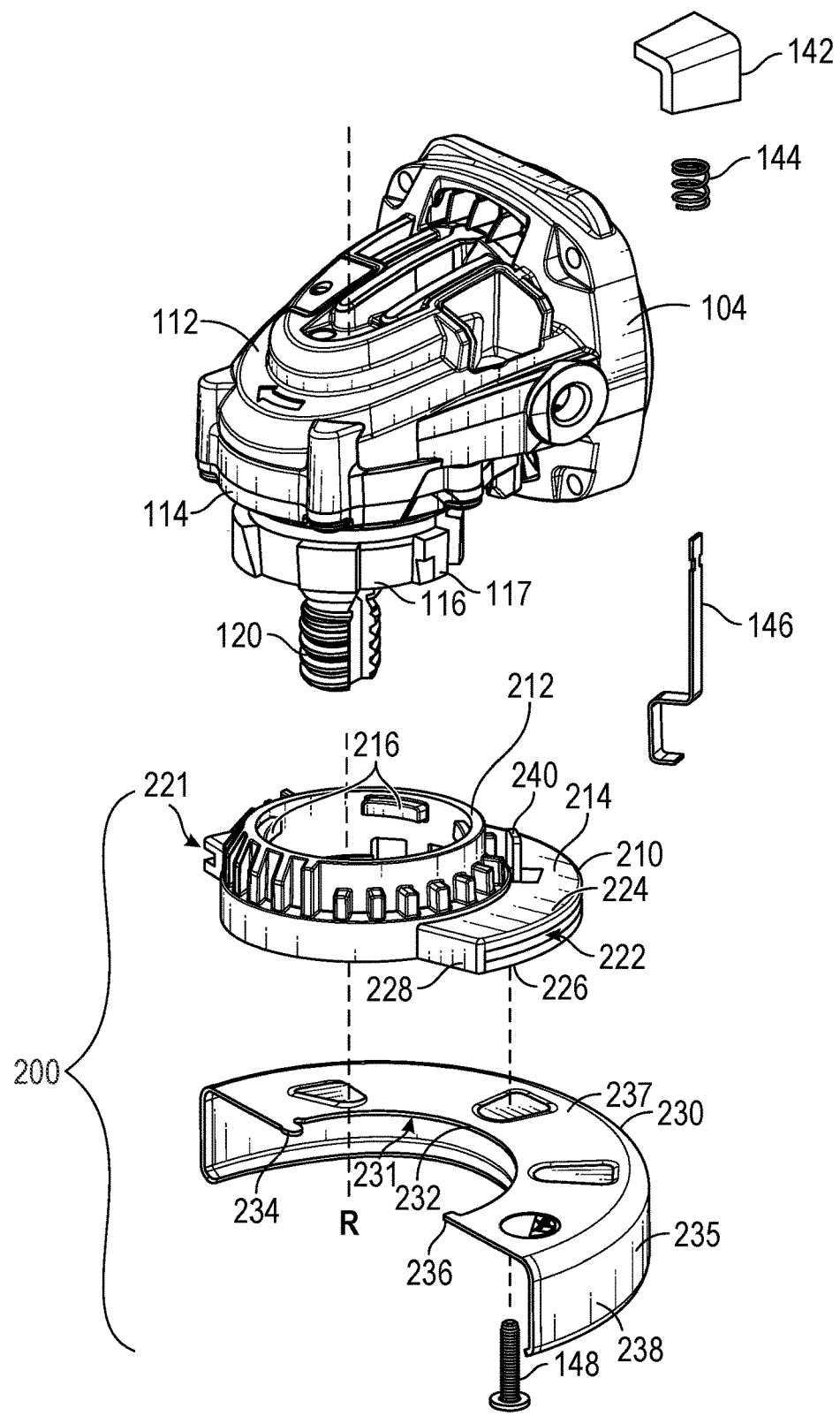
FIG. 2 illustrates an exploded view of the gear case and the shield assembly of the handheld tool device of FIG. 1.

FIG. 2 illustrates an exploded view of the gear case 104 and the shield assembly 200 of the handheld tool device 100 of FIG. 1. In particular, FIG. 2 illustrates a user actuator portion 142, a biasing member 144, the gear case 104, a locking arm 146, the shield assembly 200, and a screw 148. It will be appreciated that FIG. 2 represents examples and other examples may use fewer, additional, or different components or arrangements.

The gear case 104 houses a gear assembly that drives a dynamic working tool (e.g., the dynamic working tool 105). The gear case 104 includes an upper cover section 112 (sometimes referred to as a first side) and a lower cover section 114 (sometimes referred to as a second side) through which a tool spindle 120 extends. The tool spindle 120 is rotated by an armature assembly (not shown) about a spindle rotational axis R. A working tool, e.g., a grinder wheel, is coupleable to the tool spindle 120 (e.g., as seen in FIG. 1). Rotation of the tool spindle 120 causes a corresponding rotation in the working tool.

The shield assembly 200 includes a guard collar 210 and a guard member 230. The guard collar 210 is circumferentially attachable around a neck 116 of gear case 104. In some cases, the guard member 230 is intended for permanent attachment to the gear case 104 (e.g., requiring a moderate disassembly of the handheld tool device to remove therefrom). This feature may be in direct contrast with the guard member 230, which may be intended for temporary attachment and may be interchangeable with other compatible guard members, as described herein.

The guard collar 210 includes a base portion 212 for extending around (e.g., completely around) the neck 116 of the gear case 104. The base portion 212 includes an internal engagement interface 216 for coupling with a complementary engagement interface 117 on an exterior surface the neck 116 of the gear case 104. Such a configuration allows the guard collar 210 to circumferentially attach to the neck 116 of the gear case 104 by positioning the guard collar 210 around the neck 116 and aligning features of the engagement interfaces 216, 117. In this example, the engagement features include protrusions disposed at predetermined radial locations. However, it will be appreciated that the engagement features can include any coinciding coupling features, such as, but not limited to, a snap fit pairing, a living hinge and coinciding lip, an interference fit pairing, or a protrusion and slot.

The guard collar 210 includes a guard attachment portion 214 that extends radially outward from the base portion 212. The guard attachment portion 214 may be asymmetrically balanced around the perimeter of the base portion 212. For example, the guard attachment portion 214 may extend about 120°, about 130°, about 140°, about 150°, about 160°, about 170°, about 180°, about 190°, about 200°, about 210°, about 220°, about 230°, or about 240° around the base portion 212. In this example, the base portion 212 can be substantially cylindrical and the guard attachment portion 214 has a generally semi-circular configuration. However, it will be appreciated that the shape of the base portion 212 and/or the guard attachment portion 214 may vary across embodiments. For example, the base portion 212 can be relatively rectangular, triangular, spherical, conical, or helical in shape, and the guard attachment portion 214 may include any shape that might radially engage the base portion 212.

The guard attachment portion 214 includes a first engagement interface 221 that extends along at least a portion of its outer perimeter. In some cases, the first engagement interface 221 extends a majority of the perimeter of the guard attachment portion 214. The first engagement interface 221 defines a circumferential recess 222 (sometimes referred to as a circumferential groove) for mating with a circumferential engagement member 232 of the guard member 230. The circumferential recess 222 can extend along a majority (e.g., 75%, 90%, 95%, 100%) of an outer perimeter of the guard attachment portion 214. Furthermore, the circumferential recess 222 may be a single, continuous recess. In some cases, circumferential recess 222 includes additional cavities (not shown) at each end. The cavities can be sized to receive the pivot member 234 and the protruding member 236. The first engagement interface 221 can include a curved upper wall 224, a curved lower wall 226, and a side wall 228 that define the circumferential recess 222.

The guard member 230 includes a second engagement interface 231 for removably engaging with the first engagement interface 221 to secure the guard member 230 to the guard collar 210. The second engagement interface 231 includes a circumferential engagement member 232, a pivot member 234, and a protruding member 236 for mating with the circumferential recess 222 of the first engagement interface 221. Such a configuration allows the guard member 230 to be circumferentially attached to the guard collar 210 by inserting the pivot member 234 into an end of the circumferential recess 222 and pivoting the guard member 230 about the pivot member 234 to insert the circumferential engagement member 232 and the protruding member 236 into the circumferential recess 222. Engagement of the first engagement interface 221 and the second engagement interface 231 couples the guard collar 210 and the guard member 230 and restricts rotational movement of the guard member 230 relative to the guard collar 210. In this example, the first and second engagement interfaces 221, 231 are implemented in a tongue-and-groove-like design. In particular, the circumferential engagement member 232 is illustrated as an internal rim or edge of the guard member 230. However, it will be appreciated that the first engagement interface 221 and the second engagement interface 231 can include any complementary engagement portions, such as, but not limited to, a snap fit pairing, a living hinge and coinciding lip, an interference fit pairing, or a protrusion and slot.

The guard member 230 includes a body portion 235 for at least partially surrounding a working member of the power tool. By way of example, the body portion 235 can extend about 150° to about 210° around the working tool, about 170° to about 190° around the working tool, less than about 270° around the working tool, more than about 250° around the working tool, less than about 210° around the working tool, or about 180° around the working tool. In some cases, the guard member 230 is implemented as a surface grinding shroud or a type 11 guard. The body portion 235 includes a generally planar portion 237 oriented orthogonal to a rotation axis R of the tool spindle 120 and a transverse portion 238 oriented generally parallel to the rotational axis R of the tool spindle 120. In some cases, an internal edge of the generally planar portion 237 defines the circumferential engagement member 232.

The locking arm 146 cooperates with the shield assembly 200 to secure the rotational position of the shield assembly 200 with respect to the neck 116, the tool spindle 120 and, consequently, the working tool. For example, the biasing member 144 biases the locking arm 146 (e.g., a locking bar) in a first direction (e.g., up), causing the locking arm 146 to engage a pocket (not shown) of the guard collar 210 and restrict rotational movement of the guard collar 210 relative to the tool spindle 120. The user actuator portion 142 (e.g., a button) and the biasing member (e.g., a spring) are in communication with the locking arm 146 such that when an operator presses the user actuator portion 142, the force on the user actuator portion 142 opposes the bias force of the biasing member 144, causing the locking arm 146 to move in a second direction (e.g., down), opposite the first direction. In this way, pressing the user actuator portion 142 causes the locking arm 146 to disengage from a pocket or detent (e.g., detent 802 of FIG. 9) of the guard collar 210, thereby allowing rotation of the guard collar 210 about the tool spindle 120. In some cases, the user actuator portion 142 is positioned on the upper cover section 112 of gear case 104 and the locking arm 146 extends at least partially through or alongside the gear case 104, and substantially parallel to the rotation axis R of the tool spindle 120. By positioning the user actuator portion 142 on the upper cover section 112 of gear case 104, an operator can easily adjust the position of the shield assembly 200 about the tool spindle 120.

FIGS. 3A-3D illustrate an example of a transitional sequence for attaching a guard member 330 to a guard collar 310. The guard member 330 and the guard collar 310 are examples of the guard member 330 and the guard collar 310 of FIG. 1, respectively. It will be appreciated that the particular ends on which the pivot and protruding members are located can vary across embodiments (e.g., they can be reversed). It will be further appreciated that the guard collar 310 may be attached to a gear case (e.g., the gear case 104) prior to the guard collar 310 being attached to the guard collar 310.

Figure 3A:
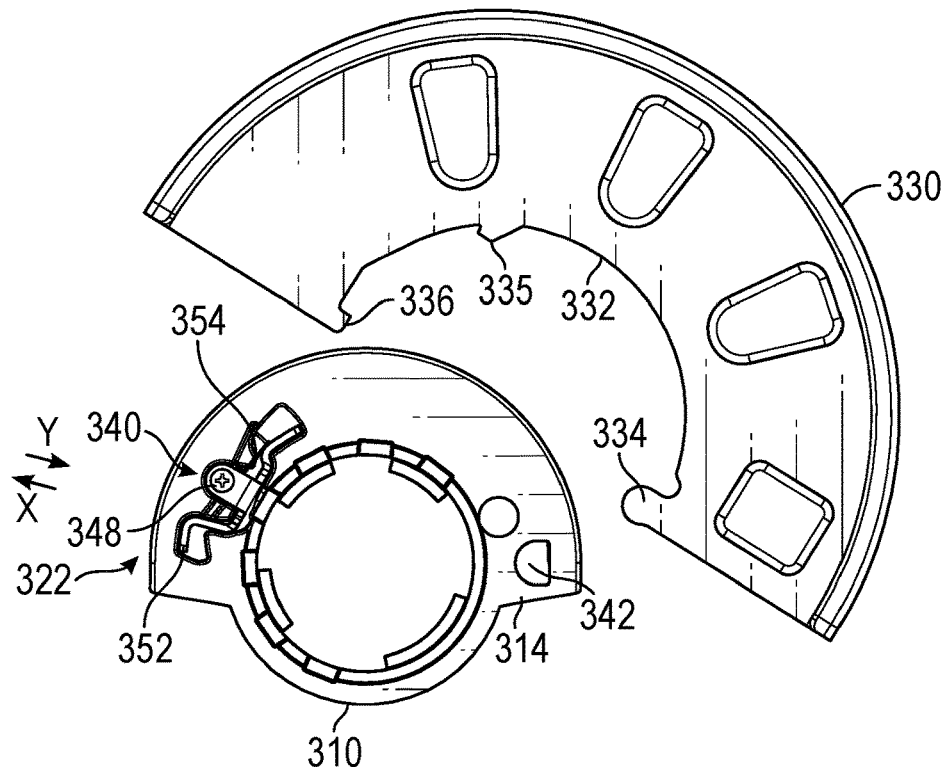
FIGS. 3A-3D illustrate an example transitional sequence for installing a guard member onto a guard collar in accordance with the present disclosure.

FIG. 3A illustrates the guard member 330 separate from the guard collar 310. The guard member 330 includes a circumferential engagement member 332, a protruding member 336 and a pivot member 334 on opposite ends of the circumferential engagement member 332. In addition, as described in more detail herein, the guard member 330 includes a protrusion 335 along the circumferential engagement member 332 as part of a lock-out scheme.

The guard collar 310 includes a circumferential recess 322 along an outer perimeter of the guard attachment portion 314. The guard collar 310 also includes a cavity 342 proximate to one end of the circumferential recess 322 and a locking assembly 340 proximate to an opposite end of the circumferential recess 322. The cavity 342 is sized to receive the pivot member 334 and the locking assembly 340 is configured to interact with the protruding member 336 to releasably secure the guard member 330 to the guard collar 310. The guard collar 310 can include a locking assembly 340 for releasably securing the guard member 330 to the guard collar 310. The locking assembly 340 includes a latch 352, a biasing member 354 (e.g., a torsion spring) that biases the latch 352 in a first direction X, and screw 348. The screw 348 secures the latch 352 to the guard collar 310 and functions as a pivot point about which the latch 352 can pivot. The latch 352 may be a formed sheet metal latch, among other examples.

Figure 3B:
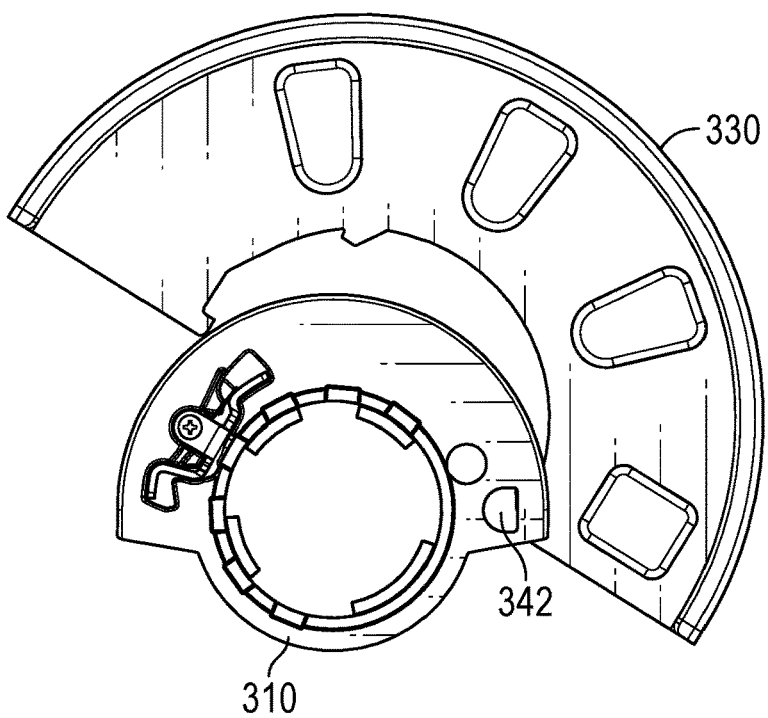

As shown in FIG. 3B, attaching the guard member 330 to the guard collar 310 includes inserting the pivot member 334 of the guard member 330 into the cavity 342 of the circumferential recess 322 of the guard collar 310. The guard member 330 is then pivoted about the pivot member 334, towards the guard collar 310 to insert the protruding member 336 into the circumferential recess 322.

Figure 3C:
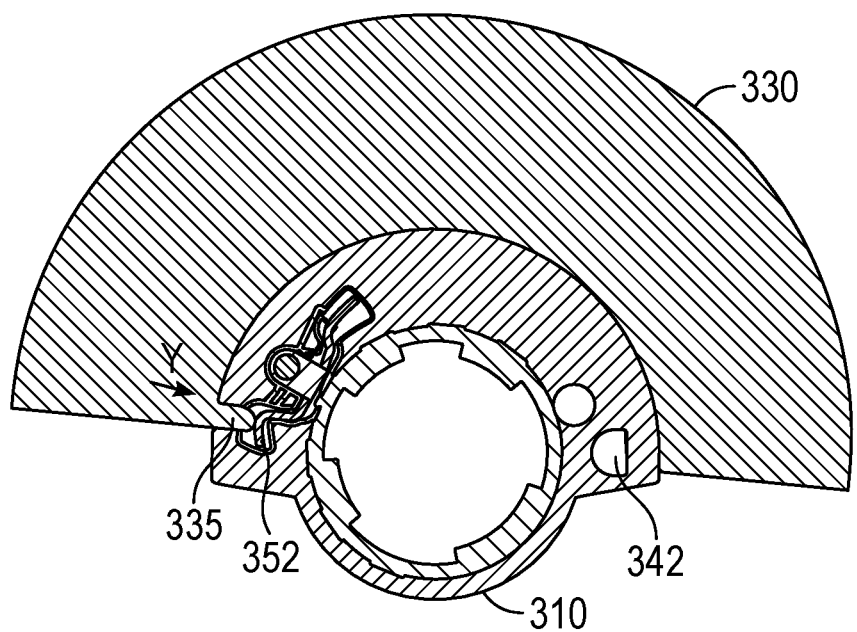

As shown in FIG. 3C, the locking assembly 340 cooperates with the protrusion 335 of the guard member 330 to secure the guard member 330 to the guard collar 310. In particular, FIG. 3C illustrates the protrusion 335 contacting the latch 352. As the guard member 330 is pivoted about the pivot member 334, the circumferential engagement member 332 is inserted into the circumferential recess 322 and the protrusion 335 contacts the latch 352 and imparts a force on the latch 352 that opposes the bias force of the biasing member 354, thereby pivoting the latch 352 in a second direction Y and allowing the protrusion 335 to pass by the latch 352.

Figure 3D:
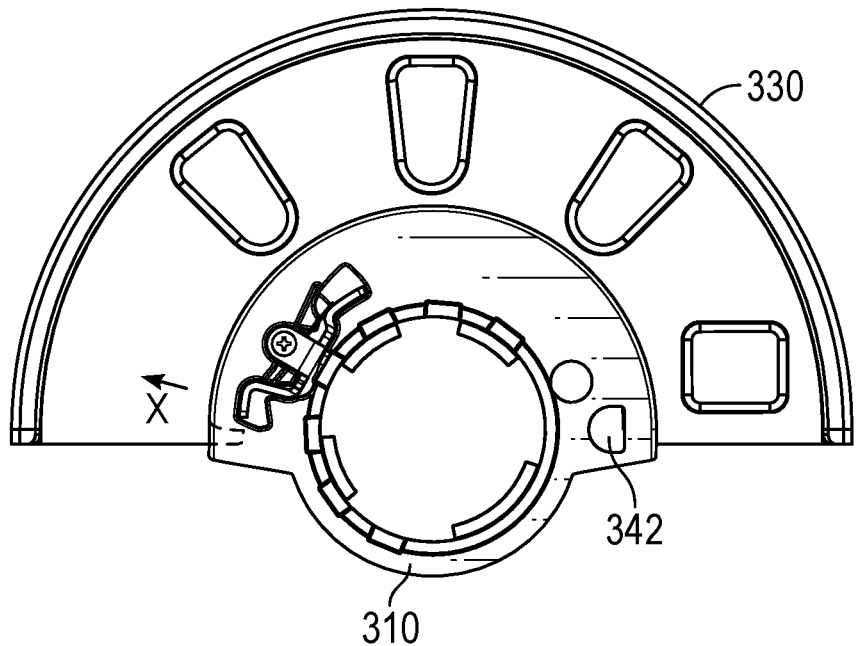

FIG. 3D illustrates the guard member 330 attached to the guard collar 310. As shown, after the protrusion 335 passes the latch 352, the biasing member 354 biases (e.g., closes) the latch 319 in the first direction X, thereby securing the guard member 330 to the guard collar 310. Once secured, due at least in part to the tongue and groove design, the guard member 330 is advantageously supported along the full circumference of its interface with the guard collar 310, which increases the strength of the bond between the guard member 330 and the guard collar 310. Furthermore, the spring pressure from the biasing member 354 can provide upward bias that helps reduce vibration of the guard collar 310 during use.

To remove the guard member 330 from the guard collar 310, an operator can actuate the latch 352 (e.g., move it in the open direction) and rotate the guard member 330 out of the circumferential recess 322 of the guard collar 310.

Figure 4:
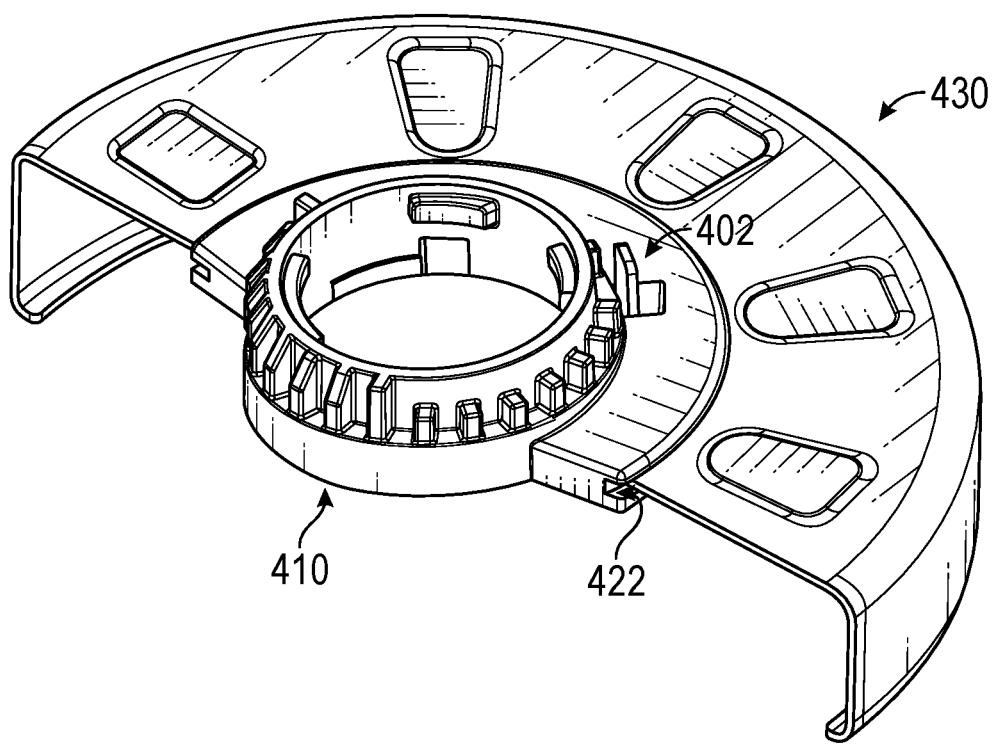
FIG. 4 illustrates a perspective view of a guard member circumferentially attached to the guard collar.
Figure 5A:
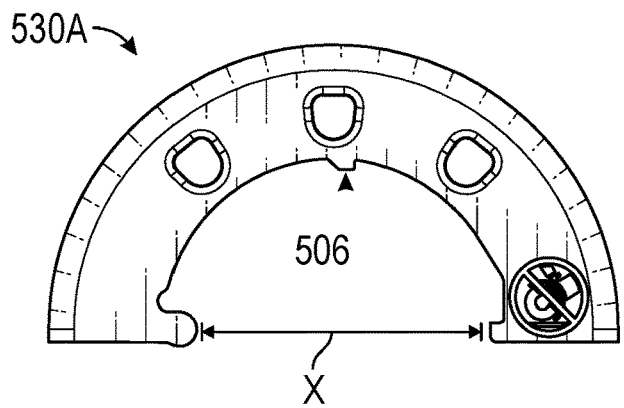
FIGS. 5A-5D illustrate cross-sectional views of example guard members in accordance with the present disclosure.
Figure 5B:
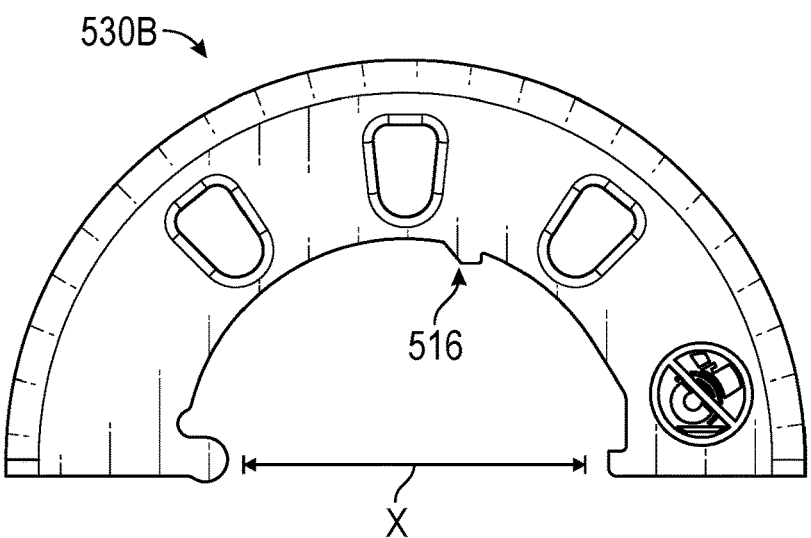
Figure 5C:
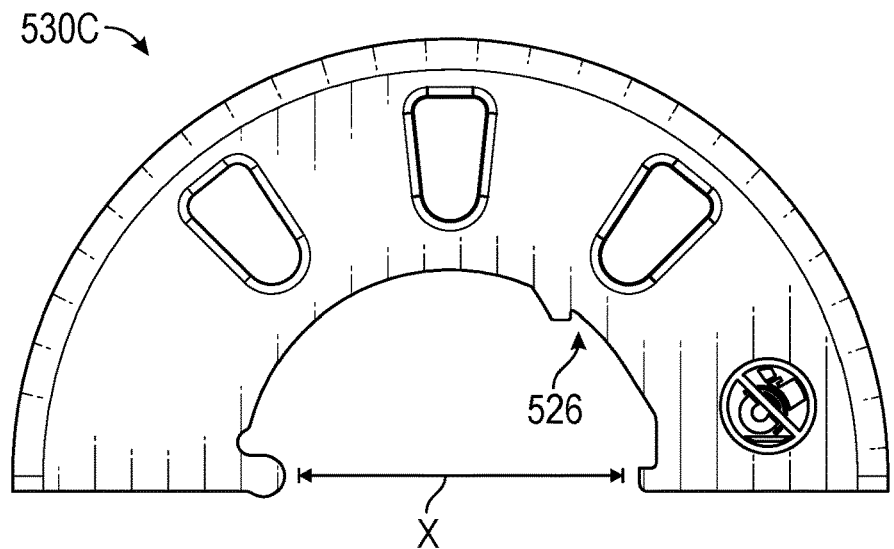
Figure 5D:
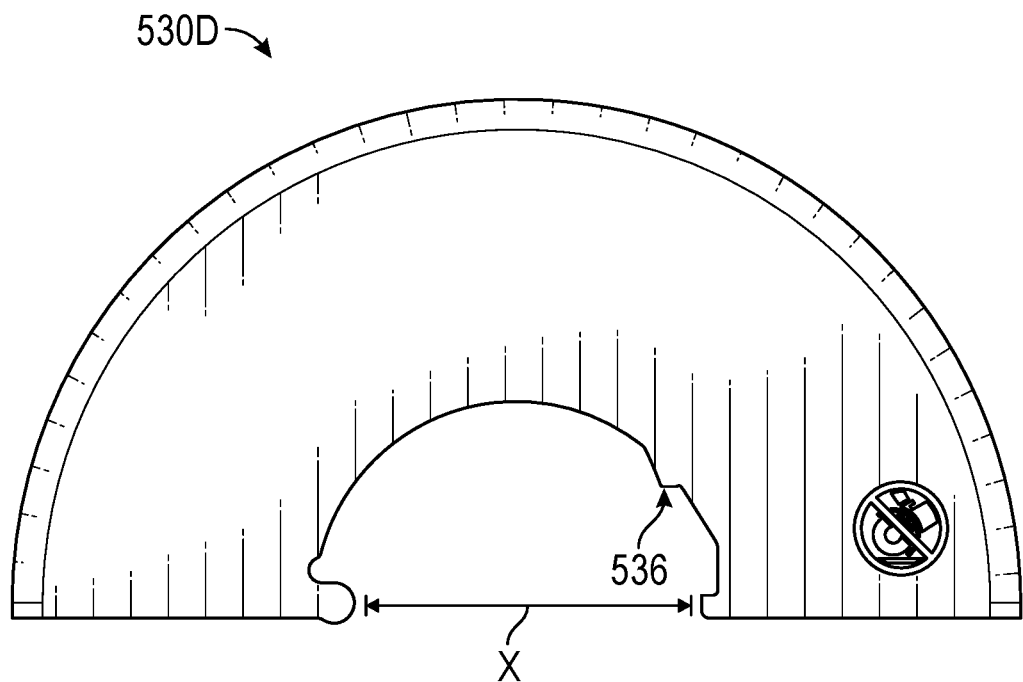

FIG. 4 illustrates an example guard member 430 circumferentially attached to an example guard collar 410. The guard member 430 and the guard collar 410 are examples of the guard member 230 and the guard collar 210 of FIG. 1, respectively. As shown, the guard collar 410 includes an unlocking member 402 for facilitating detachment of the guard member 430 from the guard collar 410. The unlocking member 402 is couple to the latch (e.g., latch 352) and is movable by an operator. Moving the unlocking member 402 can move the latch from a locked position, in which the guard member 430 is secured to the guard collar 410, to an unlocked position, in which the guard member 430 may be disengaged from the guard collar 410.

Due in part to safety considerations, it will be appreciated that a particular guard member may not be suitable for all types or sizes of power tools. For example, a 6-inch guard member may be suitable for a 6-inch angle grinder, but the same 6-inch guard member may not be suitable for a 5-inch angle grinder. Similarly, a particular guard member may not be suitable for all types or sizes of dynamic working tools. For example, a Type A (cutting) guard member may be suitable for a cutting disc, but the same Type A (cutting) guard member may not be suitable for a grinding disc. To that end, while it can be important for a guard collar to have compatibility with different interchangeable guard members (e.g., to accommodate different potential uses of the power tool), it can also be important that the guard collar is not compatible with all guard members, such as those that are unsuitable for the particular power too. To address these or other problems, disclosed herein is shield assembly that implements a lock-out scheme that advantageously reduces the likelihood that a guard collar is mated with a non-satisfactory guard member. By utilizing a lock-out scheme that allows some guard members to attach to a guard collar (generally referred to as "satisfactory" guard members) and inhibits other guard members from attaching to the guard collar (generally referred to as "unsatisfactory" guard members), the disclosed shield assembly advantageously reduces the likelihood of deployment of a guard member that is unsatisfactory for the particular guard collar.

In some cases, a particular guard member may be deemed unsatisfactory for a particular guard collar if that guard member is too large or too small for the power tool to which the guard collar is attached. In some cases, a particular guard member may be deemed satisfactory or unsatisfactory for a particular guard collar based on a lockout policy. The lockout policy can indicate that any guard member of a first group of guard members is satisfactory for a first guard collar. As a corollary, the lockout policy can indicate that any guard member of a second group of guard members is unsatisfactory for the first guard collar. In some cases, the lockout policy can be based on the size of the guard member. For example, the lockout policy can indicate that guard members under a particular size (e.g., less than 6 inches) are satisfactory for a first power tool and, as a corollary, can indicate that guard members at or over a particular size (e.g., greater than or equal to 6 inches) are unsatisfactory for the first power tool. As another example, the lockout policy can be based on an intended use of the first power tool. For example, the lockout policy can indicate that certain type guard members (e.g., Type A) are satisfactory for a second power tool, and other type guard members (e.g., Type B) are unsatisfactory for the second power tool. Furthermore, it will be appreciated that the lockout policy may be generated or modified, such as based on manufacturers or safety guidelines.

FIGS. 5A-5D illustrate cross-sectional views of example guard members 530A, 530B, 530C, 530D in accordance with the present disclosure. The guard members 530A, 530B, 530C, 530D (individually or collectively referred to as guard member 530 or guard members 530) are examples of and can include any feature of the guard member 130 of FIG. 1. Each of the guard members includes a different-sized body portion, but a similarly sized receiving regions (as indicated by the dimension X) for receiving a guard collar. Furthermore, each of the guard members 530 includes a protrusion 506, 516, 526, 536 disposed at a different radial location along their respective second engagement interface. The plurality of protrusions 506, 516, 526, 536 may be referred to as locking features. As described herein, the protrusions 506, 516, 526, 536 are part of a lock-out scheme implemented on the guard members 530 to inhibit the guard members 530 from being used in applications for which they are unsatisfactory.

Figure 6:
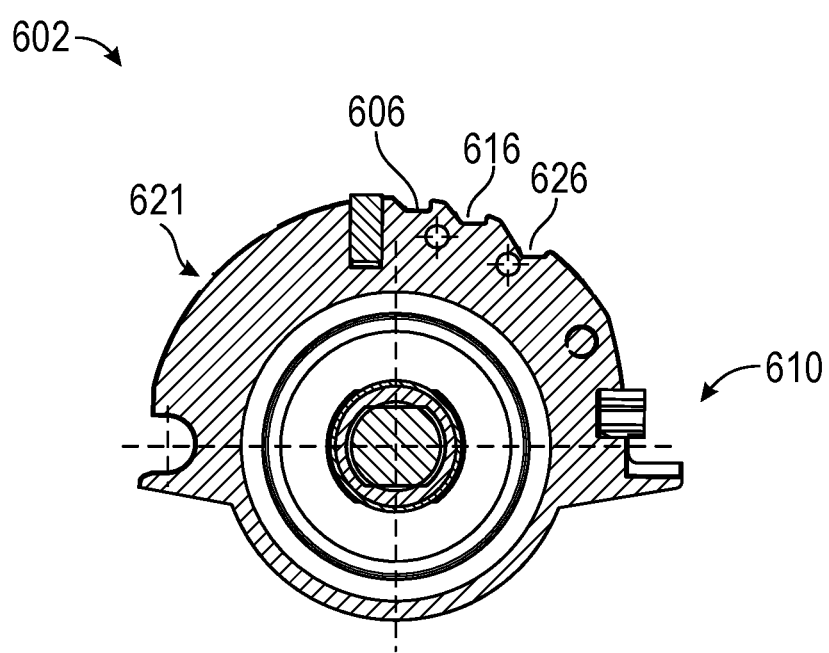
FIG. 6 illustrates cross-sectional view of an example guard collar in accordance with the present disclosure.

FIG. 6 illustrates a cross-sectional view of an example guard collar 602 in accordance with the present disclosure. The guard collar 610 is an example of, and can include any feature of, the guard collar 110 of FIG. 1.

As shown, the first engagement interface 621 defines a set of cavities (or notches) 606, 616, 626 along an exterior perimeter of the guard attachment portion. The plurality of cavities 606, 616, 626 may be referred to as locking features. The plurality of cavities 606, 616, 626 are part of a lock-out scheme implemented on the guard collar 602. Such as lock-out scheme configuration, when coupled with a corresponding lock-out scheme implemented on the guard members, enables some (satisfactory) guard members to attach to the guard collar 602, while inhibiting other (unsatisfactory) guard members from attaching to the guard collar 602. For example, each guard member of a first set of guard members (satisfactory guard members) is interchangeably compatible with the guard collar 602. Each guard member of the first set of guard members may include a respective set of zero, one, or more engagement protrusions. And, since the first set of guard members are compatible with the guard collar 602, each engagement protrusion of a respective set of engagement protrusion aligns with a cavity of the set of cavities 606, 616, 626 to enable secure attachment of the respective guard member to the guard collar.

In contrast, each guard member of a second set of guard members (unsatisfactory guard members) is not compatible with the guard collar 602. For example, each guard member of the second set of guard members may include a respective set of one or more engagement protrusions. However, in contact to the first set of guard members, each guard member of the second set of guard members includes at least one engagement protrusion that does not align with any cavities of the set of cavities 606, 616, 626, thereby preventing secure attachment of the respective guard member to the guard collar 602.

FIGS. 7A-7D illustrate cross-sectional views of the guard members of FIG. 7A-7D attached (or attempted to attach) to the guard collar of FIG. 6. Continuing with the example above, each of the guard members 530A, 530B, 530C is compatible with the guard collar 602 and therefore fall within the first set of guard members, while the guard member 530D is incompatible with the guard collar 602 and therefore falls within the second set of guard members.

Figure 7A:
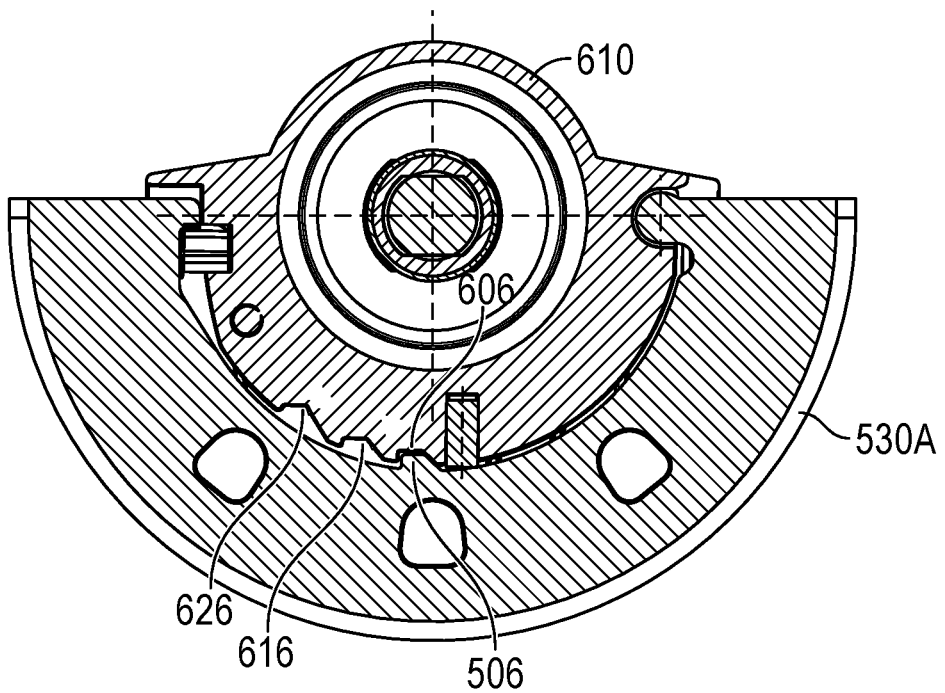
FIGS. 7A-7D illustrate cross-sectional views of the guard members of FIG. 7A-7D attached to the guard collar of FIG. 6.
Figure 7B:
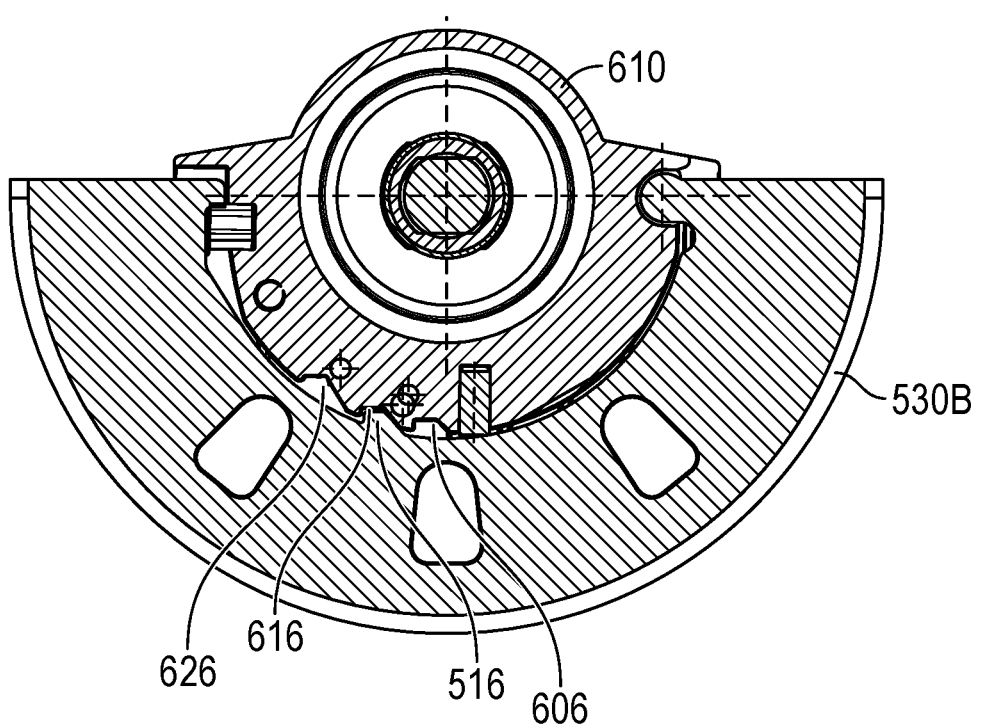
Figure 7C:
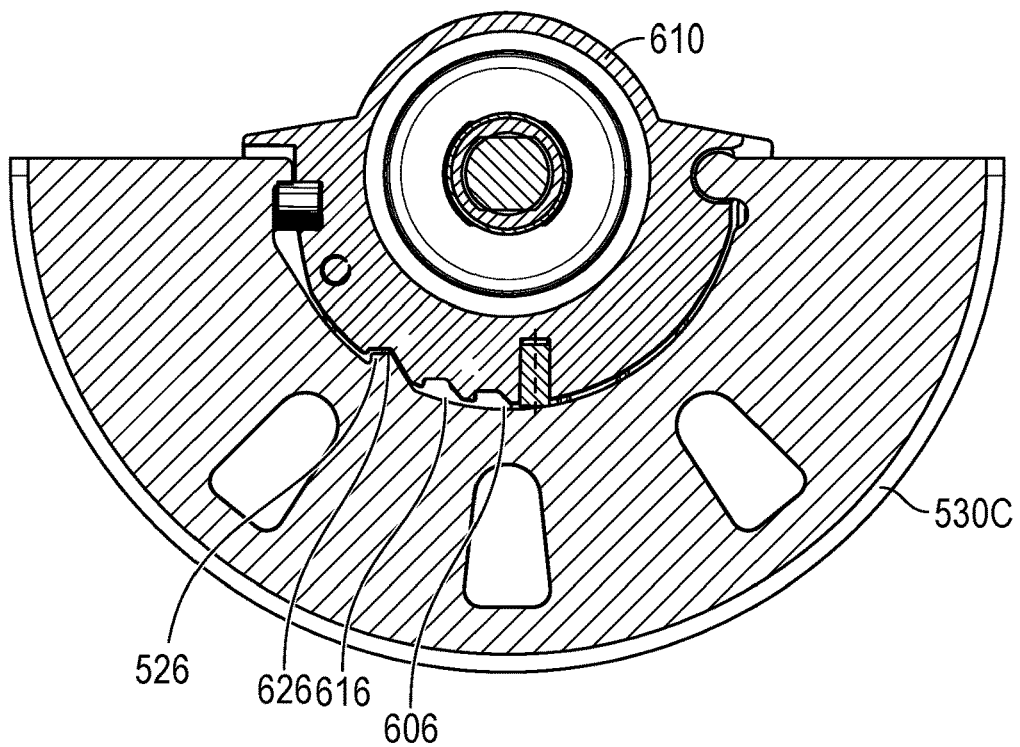
Figure 7D:
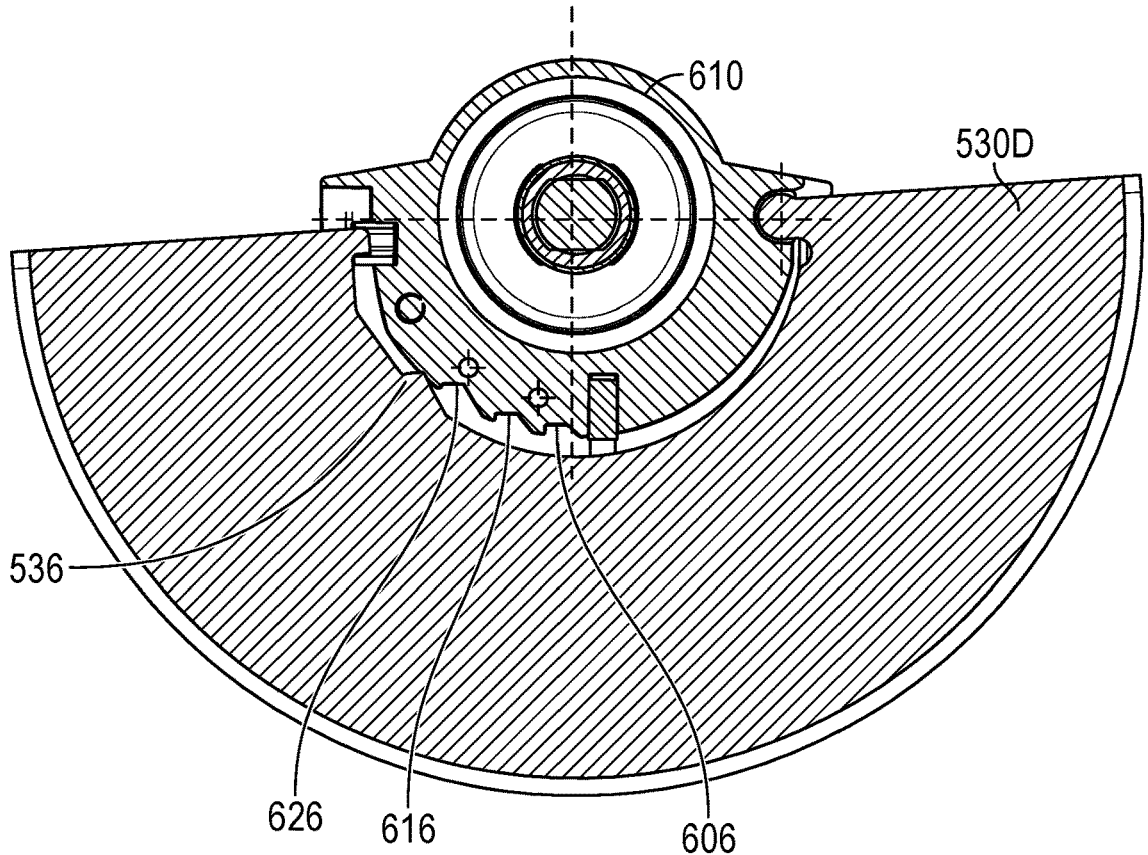

In particular, FIGS. 7A-7C show that the protrusions 506, 516, 526 of the guard members 530A, 530B, 530C align with the notches 606, 616, 626, respectively. In this way, as shown by FIGS. 7A-7C, the guard members 530A, 530B, 530C can be securely attached to the guard collar 602. In contrast, FIG. 7D shows that the protrusion 536 of the guard member 530D does not align with any of the notches 606, 616, 626. Therefore, as shown in FIG. 6, the guard member 530D cannot be securely attached to the guard collar 602 because the protrusion 536 causes a gap between the guard member 530D and the guard collar 602.

It will be appreciated that the implementation of lock-out scheme may vary across embodiments. For example, the protrusions and notches may be reversed such that the guard member includes one or more notches, and the guard collar includes one or more protrusions. In addition or alternatively, the lock-out scheme may include any coinciding coupling features, such as, but not limited to, a snap fit pairing, a living hinge and coinciding lip, an interference fit pairing, or a protrusion and slot.

Figure 8A:
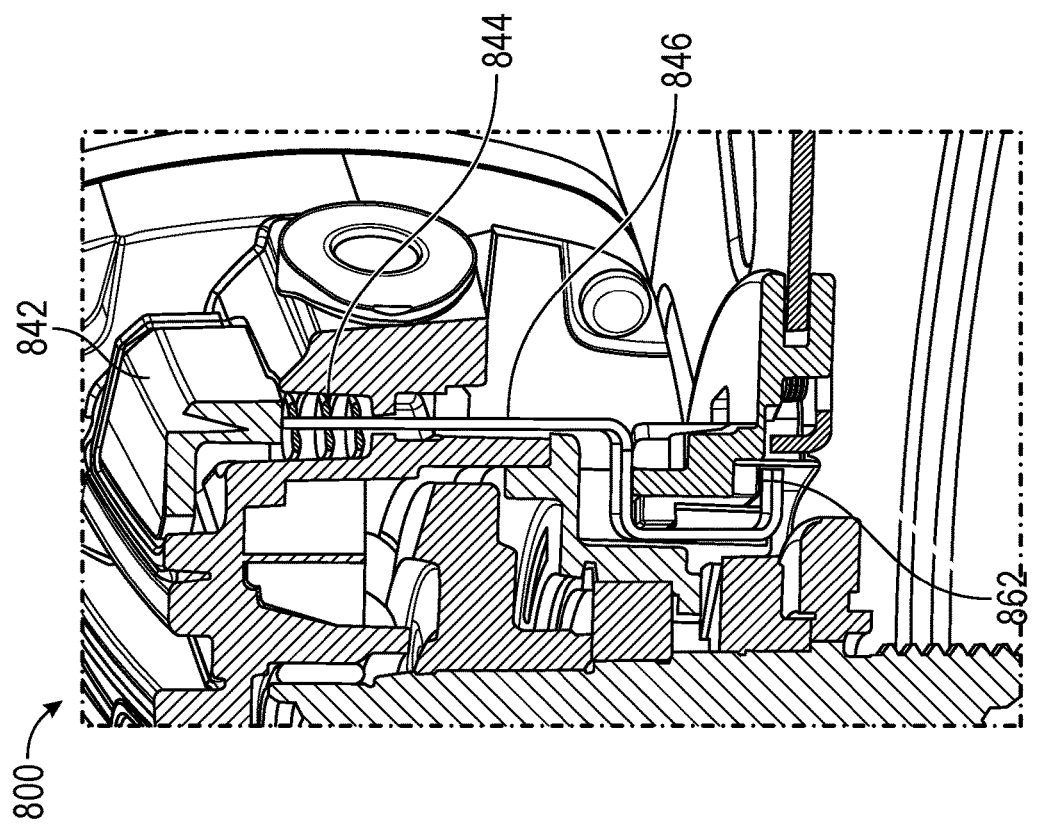
FIGS. 8A and 8B illustrate a cross-sectional view of a portion of the power tool in accordance with the present disclosure.
Figure 8B:
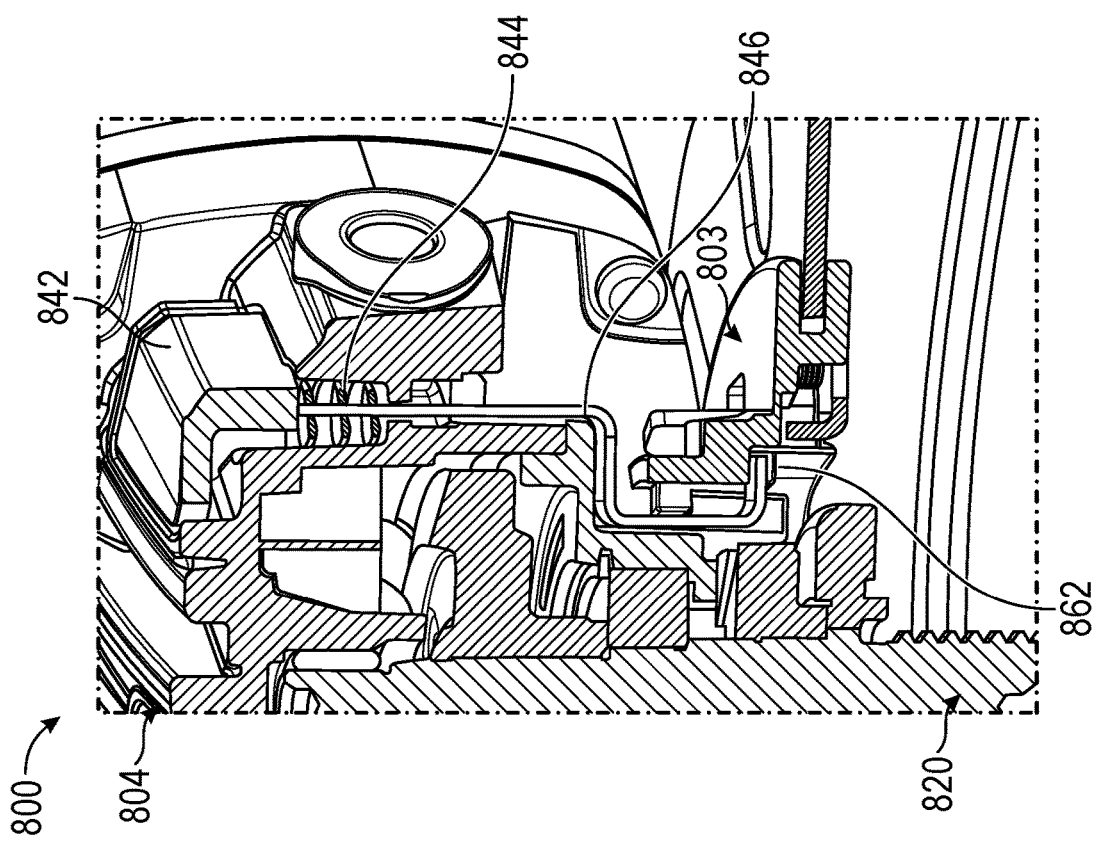

FIGS. 8A and 8B illustrate a cross-sectional view of a portion of the power tool 800 in accordance with the present disclosure. The power tool 800 is an example of the handheld device 100 of FIG. 1. Among other features, the power tool 800 includes a gear case 804, a tool spindle 820, a shield assembly 803, and locking assembly for releasably securing a rotational position of the shield assembly 803 with respect to the tool spindle 820. The locking assembly includes a user actuator portion 842, a biasing member 844, and a locking arm 846.

The tool spindle 820 is mechanically coupled to a gear assembly in gear case 804, and the tool spindle 820 is mechanically coupled to a dynamic working tool (not shown). The gear assembly drives rotation of the tool spindle 820 about a rotation axis. The rotation of the tool spindle 820 causes a corresponding rotation in the dynamic working tool. As described herein, the gear case 804 can include a first, lower side and a second, upper side.

The shield assembly 803 is an example of, and can include any of the features of, the shield assembly 200 of FIG. 1. The shield assembly 803 can be positioned proximate the first, lower side of the gear case 804 such that shield assembly 803 can at least partially surrounding the dynamic working tool. The locking arm 846 can extend substantially parallel to a rotation axis of the tool spindle 820 and can include a curved portion for engaging the shield assembly.

The user actuator portion 842 can be positioned proximate the second, upper side of the gear case 804. For example, the user actuator portion 842 can be positioned on top of the gear case 804. The user actuator portion 842 can be implemented as a push button. The biasing member 844 (e.g., a compression spring) is positioned between the user actuator portion 842 and the locking arm 846. The biasing member 844 exerts a bias force to engage the locking arm 846 with the shield assembly 803. When an operator activates (e.g., presses down on) the user actuator portion 842, the operator introduces a force on the locking arm 846 that opposes the bias force of the biasing member 844, and disengages the locking arm 846 from the shield assembly 803 (e.g., from a detent 862 in the shield assembly 803). FIG. 8B illustrates the user actuator portion 842 pressed down and the locking arm 846 disengaged from the shield assembly 803.

Figure 9:
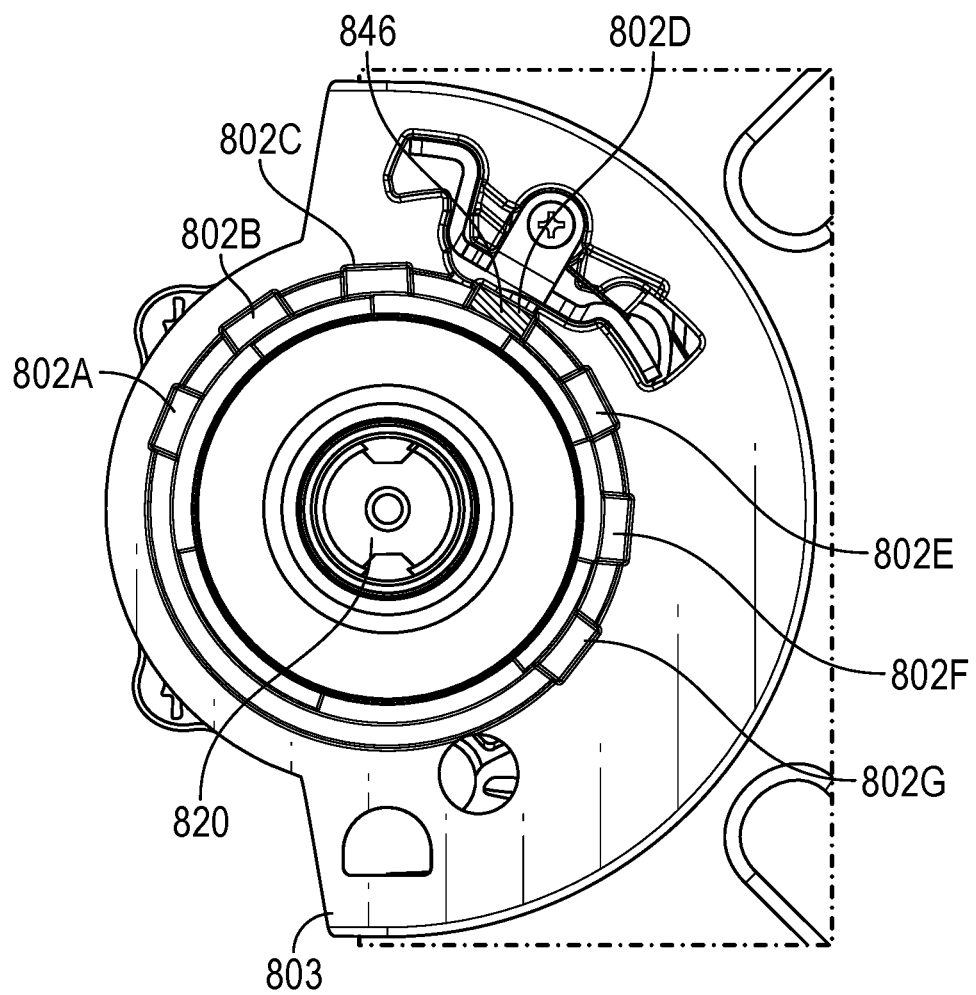
FIG. 9 illustrates a bottom view of a portion of the power tool of FIG. 8.

FIG. 9 illustrates a bottom view of a portion of the power tool 800 of FIG. 8. In particular, FIG. 9 illustrates the bottom of shield assembly 803. As shown, the shield assembly 803 defines a plurality of radially spaced detents 802A, 802B 802C, 802D, 802E, 802F, 802G (individually or collectively referred to as detent 802, detents 802, or pockets 802), and the locking arm 846 engages the shield assembly 803 by removably engaging a selected detent (in this example, detent 802D) of the plurality of radially spaced detents 802. As described herein, an unlocking force imparted on the user actuator portion causes displacement of the locking arm 846 from a detent of the plurality of radially spaced detents 802 and allows rotational movement of the shield assembly 803 relative to the tool spindle 820. After application of the unlocking force to the user actuator portion, rotational movement of the shield assembly 803 is permitted until the unlocking force is removed and the locking arm 846 is aligned and engages with a detent of the plurality of radially spaced detents 802. For example, when unlocked, the shield assembly 803 may be rotated such that the locking arm 846 now engages with detent 802G, for example.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "include," "can include," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the routines described elsewhere herein can be performed in a different sequence, can be added, merged, or left out altogether (non-limiting example: not all are necessary for the practice of the algorithms). Moreover, in certain embodiments, operations, acts, functions, or events can be performed concurrently, rather than sequentially.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described elsewhere herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Any terms generally associated with circles, such as "radius" or "radial" or "diameter" or "circumference" or "circumferential" or any derivatives or similar types of terms are intended to be used to designate any corresponding structure in any type of geometry, not just circular structures. For example, "radial" as applied to another geometric structure should be understood to refer to a direction or distance between a location corresponding to a general geometric center of such structure to a perimeter of such structure; "diameter" as applied to another geometric structure should be understood to refer to a cross sectional width of such structure; and "circumference" as applied to another geometric structure should be understood to refer to a perimeter region. Nothing in this specification or drawings should be interpreted to limit these terms to only circles or circular structures.

The invention claimed is:

1. A shield assembly comprising:
   a guard collar disposed around a neck of a gear case of a power tool and comprising a first engagement interface, the first engagement interface extending along at least a portion of an outer perimeter of the guard collar, and the first engagement interface defining a circumferential recess; and
   a guard member comprising a second engagement interface for removably engaging with the first engagement interface to secure the guard member to the guard collar, the second engagement interface comprising a circumferential engagement member for mating with the circumferential recess of the first engagement interface, and the guard member having a body portion for at least partially surrounding a working member of the power tool,
   wherein the guard member comprises a pivot member proximate a first end of the circumferential engagement member, and a protruding member proximate a second end of the circumferential engagement member, wherein the pivot member is insertable into a cavity of the circumferential recess and the guard member is pivotable about the pivot member towards the guard collar to insert the protruding member into the circumferential recess.

2. The shield assembly of claim 1, wherein the guard collar comprises:
   a base portion extending entirely around the neck of the gear case; and
   a guard attachment portion extending radially outward from the base portion, the guard attachment portion comprising the first engagement interface.

3. The shield assembly of claim 2, wherein the circumferential recess is a single, continuous recess that extends along a majority of an outer perimeter of the guard attachment portion.

4. The shield assembly of claim 2, wherein the guard attachment portion extends between about 120° and 240° around the base portion.

5. The shield assembly of claim 1, wherein the guard member comprises a generally semicircular body portion, wherein the body portion is generally planar and oriented orthogonal to a rotation axis of a tool spindle of the power tool and a transverse portion oriented generally parallel to the rotational axis of the tool spindle, wherein an internal edge of the generally planar body portion defines an engagement member for engaging with a circumferential recess of the guard collar.

6. The shield assembly of claim 1, wherein the protruding member is engageable by a latch of the guard collar to secure the guard member to the guard collar.

7. The shield assembly of claim 1, wherein the guard collar comprises a latch for removably securing the guard member to the guard collar, wherein during installation of the guard member on the guard collar, the latch moves to a locked position, thereby inhibiting disengagement of the guard member from the guard collar.

8. The shield assembly of claim 7, wherein the guard collar further comprises an unlocking member, wherein the unlocking member is movable to move the latch from the locked position to an unlocked position and thereby permit disengagement of the guard member from the guard collar.

9. The shield assembly of claim 1, wherein the first engagement interface defines a set of cavities along the circumferential recess, wherein the second engagement interface defines a set of protrusions along the circumferential engagement member, wherein during attachment of the guard member to the guard collar, each protrusion of the set of protrusions aligns with a respective cavity of the set of cavities.

10. The shield assembly of claim 9, wherein the set of cavities function as a lock-out scheme that inhibits a mating between the guard collar and any guard members that include one or more protrusions that do not align with a respective cavity of the set of cavities.

11. The shield assembly of claim 9, wherein the set of protrusions function as a lock-out scheme that inhibits a mating between the guard member and any guard collars that do not include a cavity for each protrusion of the set of protrusions.

12. A guard collar for a power tool, the guard collar comprising:
- a base portion extending around a neck of a gear case of the power tool; and
- a guard attachment portion extending radially outward from the base portion, the guard attachment portion comprising a first engagement interface, the first engagement interface extending along a majority of an outer perimeter of the guard attachment portion, and the first engagement interface defining a circumferential recess, wherein the first engagement interface circumferentially receives an engagement member of a guard member to removably engage the guard member with the guard collar, wherein the guard member comprises a body portion for at least partially surrounding a working member of the power tool,
- wherein the guard attachment portion further includes a cavity proximate one end of the circumferential recess and a locking assembly proximate an opposite end of the circumferential recess, wherein the guard member comprises a pivot member and a locking member, wherein the pivot member is insertable into the cavity of the circumferential recess and the guard member is pivotable about the pivot member towards the guard collar to insert the locking member into the circumferential recess in engagement with the locking assembly.

13. The guard collar of claim 12, wherein the first engagement interface defines a set of cavities along the circumferential recess, wherein the guard member is one guard member of a first set of guard members with which the guard collar is interchangeably compatible, wherein each guard member of the first set of guard members comprises a respective set of engagement protrusions, wherein each engagement protrusion of a respective set of engagement protrusion aligns with a cavity of the set of cavities to enable secure attachment of the respective guard member to the guard collar.

14. The guard collar of claim 13, wherein the set of cavities function as a lock-out scheme that inhibits a mating between the guard collar and any guard members that include one or more protrusions that do not align with a respective cavity of the set of cavities.

15. The guard collar of claim 13, wherein the first engagement interface defines a set of cavities along the circumferential recess, wherein the guard collar is not compatible with any guard member of a second set of guard members, wherein each guard member of the second set of guard members comprises a respective set of engagement protrusions, wherein for each guard member of the second set of guard members at least one engagement protrusion does not align with any cavities of the set of cavities, thereby preventing secure attachment of the respective guard member to the guard collar.

16. The guard collar of claim 13, wherein the set of engagement protrusions function as a lock-out scheme that inhibits a mating between the guard member and any guard collars that do not include a cavity for each engagement protrusion of the set of engagement protrusions.

17. A power tool comprising:
- a gear case housing a gear assembly;
- a tool spindle mechanically coupled to the gear assembly and a dynamic working tool, wherein the gear assembly drives rotation of the tool spindle about a rotation axis, and wherein the rotation of the tool spindle causes a corresponding rotation in the dynamic working tool;
- a shield assembly positioned proximate a first side of the gear case, the shield assembly having a body portion for at least partially surrounding the dynamic working tool; and
- a locking assembly for releasably securing a rotational position of the shield assembly with respect to the tool spindle, wherein the locking assembly comprises:
  - a user actuator portion positioned proximate a second side of the gear case, the second side opposite the first side, and
  - a locking arm moveable along a movement axis substantially parallel to a rotation axis of the tool spindle between a lock position in engagement with the shield assembly and an unlock position,
  - wherein an unlocking force applied to the user actuator portion disengages the locking arm from the shield assembly thereby permitting rotation of the shield assembly with respect to the tool spindle.

18. The power tool of claim 17, further comprising a biasing member positioned between the user actuator portion and the locking arm, wherein the biasing member exerts a bias force to engage the locking arm with the shield assembly.

19. The power tool of claim 17, wherein the shield assembly defines a detent in a bottom portion of the shield assembly, and wherein the locking arm engages the shield assembly by removably engaging the detent.

\* \* \* \* \*